United States Patent [19]

Usagawa

[11] Patent Number: 4,614,244
[45] Date of Patent: Sep. 30, 1986

[54] COMBINATION MEASURING APPARATUS

[76] Inventor: Mitsugu Usagawa, 2-19-8, Ujinakaigan, Minami-ku, Hiroshima-shi, Hiroshima-ken, Japan

[21] Appl. No.: 770,672

[22] Filed: Aug. 30, 1985

[30] Foreign Application Priority Data

Sep. 1, 1984 [JP] Japan ............................... 59-183339

[51] Int. Cl.⁴ ...................... G01G 21/28; G01G 13/16
[52] U.S. Cl. ..................................... 177/58; 177/110; 222/55
[58] Field of Search ..................... 177/25, 58, 59, 109, 177/110; 222/55

[56] References Cited

U.S. PATENT DOCUMENTS

| 493,797 | 3/1893 | Smyser | 177/58 |
| 570,108 | 10/1896 | Smyser | 177/58 |
| 2,679,375 | 5/1954 | Smith et al. | 177/109 X |

Primary Examiner—George H. Miller, Jr.
Attorney, Agent, or Firm—Finnegan, Henderson, Farabow, Garrett & Dunner

[57] ABSTRACT

A combination measuring apparatus including a plurality of heads provided on a machine frame. The discharge plates of the pool hoppers provided in these heads are opened and closed to throw a predetermined material to be measured into the measuring hoppers provided on the lower side of the pool hoppers. The weight of the material in each measuring hopper is measured with a weight-measuring device, such as a load cell. A combination of measuring hoppers, the weight of the material in which is the closest to a target weight set by the combination computation of the detected weights in all of the heads, are determined. The discharge plates of the selected measuring hoppers are opened to discharge the material therefrom, and supply the material to a subsequent stage, for example, a stage provided with a packaging machine. The discharge plates of the pool hoppers and measuring hoppers are opened and closed in accordance with the vertical movement, which is effected by the power from a driving unit, of a discharge plate opening and closing unit provided on the central portion of the machine frame.

6 Claims, 6 Drawing Figures

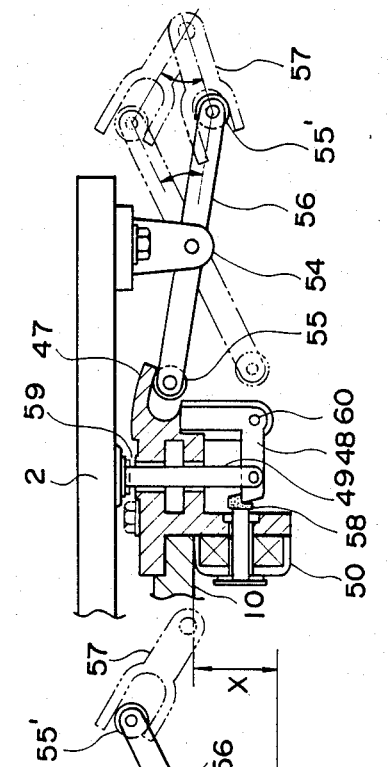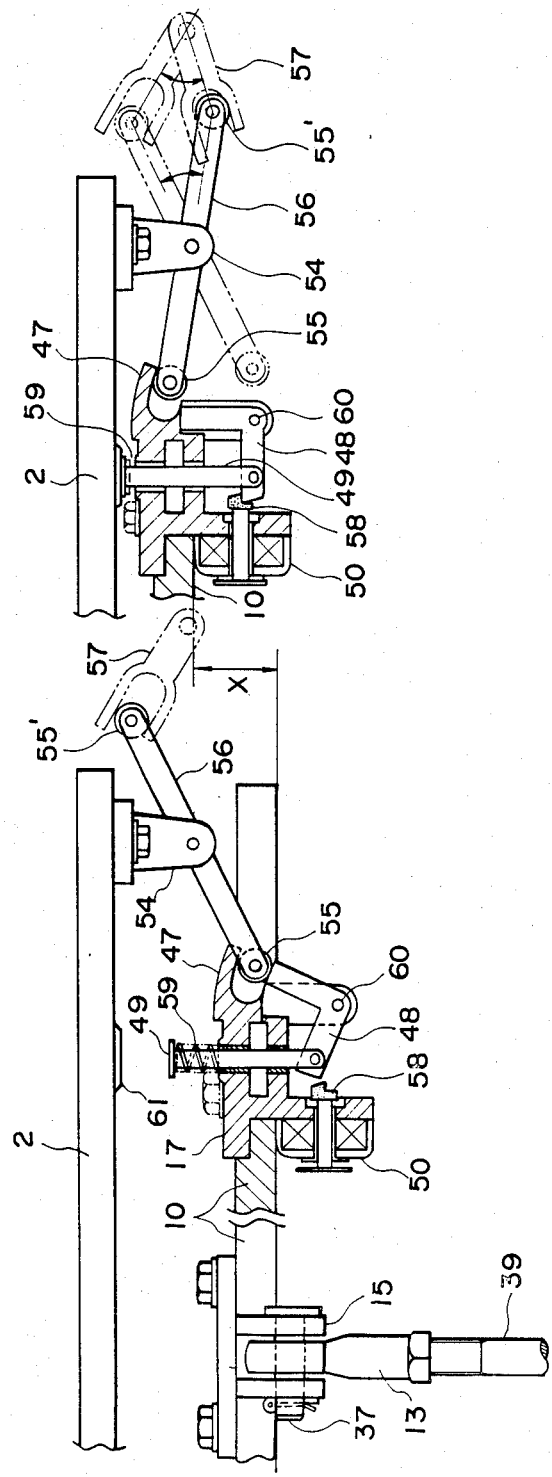

COMBINATION MEASURING APPARATUS

BACKGROUND OF THE INVENTION

1. Field of the Invention

This invention relates to an apparatus for measuring in a supermarket in a combined manner the weights of various objects, such as various goods to be packaged together, on which goods a predetermined weight is displayed after they have been measured and packaged together.

2. Description of the Prior Art

In a facility, in which a great deal of goods are handled, such as a supermarket, many kinds of goods of predetermined weights are packaged. In order to subject a large quantity of goods to measurement for preparing a plurality of sets of the goods of a predetermined weight and thereafter packaging them, it is necessary that the measurement of the weight of the goods be done accurately and speedily. In order to meet the requirements, a combination measuring apparatus having a so-called circular arrangement using a computing element in a microprocessor has recently been developed and widely employed.

In a generally-used combination measuring apparatus, the parts which will be described later are employed so as to process a large quantity of goods efficiently and increase the accuracy of the combination computation greatly. A plurality of heads, for example, fourteen heads are arranged circularly, and each head is provided with a combination of a pool hopper disposed on the upper side and a measuring hopper disposed on the lower side of and in opposition to the pool hopper. The goods to be measured are supplied from the upper central portion of the apparatus into a pool hopper via a distribution table and an electromagnetic feeder opposed to the relative head, so as to hold the goods in the pool hopper. When the measuring hopper disposed below this pool hopper has become empty, a discharge plate of the pool hopper is opened for a predetermined short period of time to feed the goods to be measured into the measuring hopper and then close the discharge plate.

In each hopper, into which the goods have been fed, the weight of the goods is detected by a weight detector, such as a load cell, and a detected signal is inputted into a computing element in a microprocessor to determine a combination of heads, in which the weight of the goods is closest to a set target level. The discharge plate of the measuring hopper in each selected head is opened for a short period of time to discharge the goods therefrom, and the discharge plate is then closed. Through such a process, the goods are subjected to weight measurement to prepare a plurality of sets of the goods of a weight substantially equal to the set target weight.

Recently, in which the circulation market has become active, the speedup of the processing of goods has strongly been demanded, and, therefore, the weight measuring process has also required to be carried out at a higher speed.

However, the construction, which obstructs the high-speed processing of goods, of the above-described conventional combination measuring apparatus has often become an issue.

In the above-described conventional combination measuring apparatus, a dropping system is employed in all of the steps of throwing goods to be measured into the upper central portion of the apparatus, supplying the goods from the electromagnetic feeders to the respective heads, feeding the goods from the pool hoppers in the heads to the corresponding measuring hoppers, and transferring the weight-measured goods from the measuring hoppers to a subsequent packaging stage. There is naturally a limit to the employment of the dropping system which is different from a forcible transfer system. In the dropping system, the goods are dropped slidingly with respect to the surface of the parts thereof, so that the dropping speed of the goods decrease due to the friction occurring between the goods and the mentioned surfaces. This prevents the speedup of the weight-measuring operation.

In order to minimize the friction occurring in a step of slide-dropping the goods to be measured, it is necessary to reduce the dropping distance, i.e. the height of a part from which the goods are dropped and the distance between this part and the part onto which the goods are dropped therefrom. However, in this conventional apparatus, the mechanism for opening and closing the discharge plates of the pool hopper and measuring hopper includes a motor, a cam link means and a crank system, which are provided for each head in the central portion of a frame of the apparatus. Therefore, the lateral distances between the center of the apparatus and the pool hopper in each head and the discharge plates cannot be reduced. As a result, the friction between the goods and the above-mentioned parts cannot be minimized. Moreover, the angles of inclination of inclined surfaces of these parts is inevitably left acute, and the heights thereof cannot be reduced.

Consequently, the height of the combination measuring apparatus increases, and various operating mechanisms therein are necessarily disposed in high positions, so that the height of the center of gravity of the apparatus increases. Hence, the apparatus becomes unstable, and the suppressing of vibration of the apparatus can be done to only a limited extent.

It is important to increase the measuring speed without decreasing the measuring accuracy in a calculation cycle in the combination measurement. The detection of the weight of goods by means of a load cell, the combination computation and the inputting of a detected signal and a control signal can be carried out electrically and statically at a high speed. However, the means for opening and closing the discharge plates of the pool hoppers and measuring hoppers are accompanied by mechanical operations, so that the reduction of measurement time is restricted. This causes the time for processing goods to be prolonged, and the parts of the apparatus to wear earlier. As a result, after the apparatus had used for a long period of time, it would rattle. This causes a decrease in the measuring accuracy and the working life of the apparatus and troubles in the repairing operation Since these mechanical operating parts are provided on the upper portion of the machine frame as mentioned above, they are apt to wear early due to the resonance caused by the mutual vibrations thereof, and the measurement accuracy of the apparatus decreases early.

SUMMARY OF THE INVENTION

The present invention has been developed with a view to solving the problems in the construction of a combination measuring apparatus which has heretofore been used. It is an object of the present invention to provide a combination measuring apparatus, in which the height of the apparatus is reduced by changing the means, which is used in a conventional apparatus of this kind, and which is arranged horizontally from the center of the apparatus to each head, for operating the discharge plates of the pool hopper and measuring hopper in each head to a means which is used for the same purpose and adapted to be moved vertically in the center of the apparatus, so as to lower the center of gravity of the apparatus satifactorily and enable the minimization of mechanical sway and vibrations of each operating part, operational troubles and a decrease in the measuring accuracy, the prolongation of the working life of the apparatus, the reduction of the distance over which the goods to be measured are slidingly dropped, the provision of inclined surfaces of parts, which have a low frictional resistance, the reduction of the time for measuring and computing operations of the apparatus, and the high-speed processing of the goods.

The above and other objects as well as advantageous features of the invention will become apparent from the following description of the preferred embodiment taken in conjunction with the accompanying drawings.

BRIEF DESCRIPTION OF THE DRAWINGS

FIG. 4A illustrates the condition of each operating part at the time when the goods to be measured are about to be discharged from a pool hopper;

FIG. 4B illustrates the condition of each operating part at the time when the discharging of the goods to be measured has been completed.

DESCRIPTION OF THE PREFERRED EMBODIMENT

An embodiment of the present invention will now be described with reference to the drawings.

Figure 1:
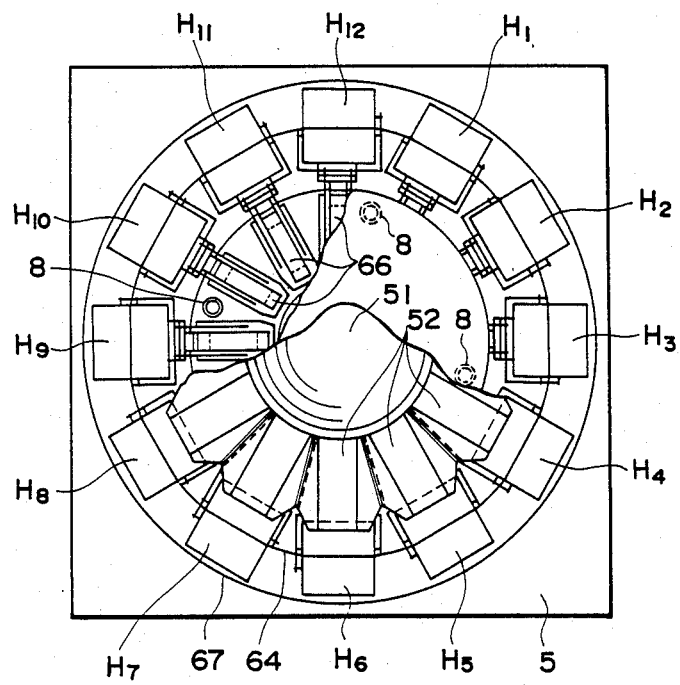
FIG. 1 is a horizontal section of an embodiment as a whole of the present invention.

FIG. 1 shows a combination measuring apparatus having a circularly arranged system according to the present invention, in which twelve heads are provided on the circumferential line in the apparatus, some of the heads being cut to show their lower portions for the convenience of preparing the drawings.

Figure 3:
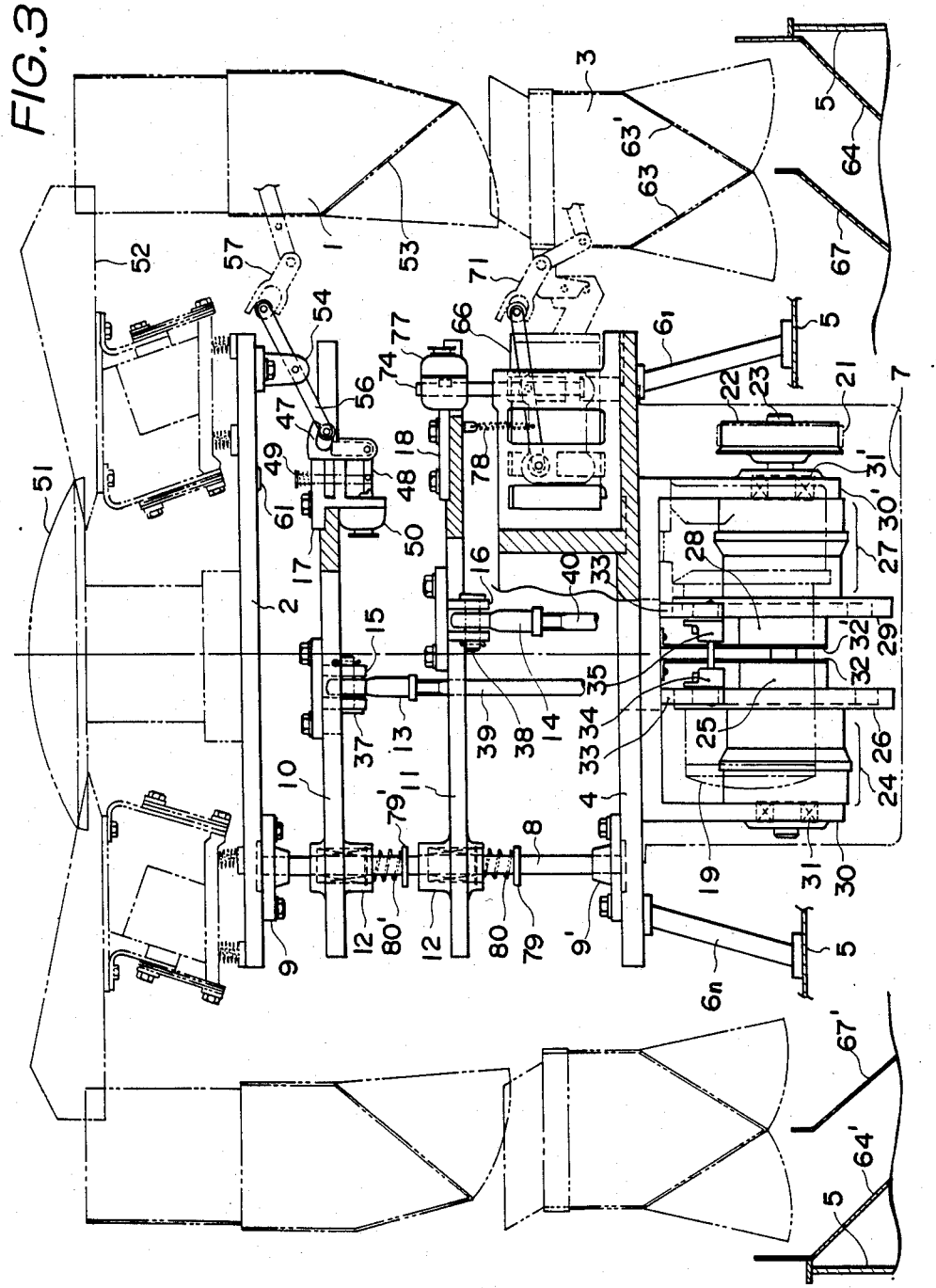
FIG. 3 is a partially sectioned side elevation of the entire, operating mechanism.

As shown in FIG. 3, a conically-shaped distribution table 51 having an electromagnetic vibrator is set on a pool hopper mounting plate 2 provided in the central upper portion of a machine frame 5. The electromagnetic feeders 52, 52 . . . in the twelve heads are provided radially around the distribution table 51, and pool hoppers 1, 1 . . . fixed to the pool hopper mounting plate 2 are positioned close to the free ends of the feeders 52, 52 . . . The measuring hoppers 3, which agree in the number with the heads, and which are positioned below and in opposition to the pool hoppers 1, are provided radially on a measuring hopper mounting plate 4, which is fixed to the central portion of the machine frame 5 via supports $6_1, 6_2 \ldots 6_n$, in such a manner that the measuring hoppers 3 are joined to load cells 66, 66 . . . in the weight measuring units provided on the circumferential portion of the mounting plate 4.

In the partially cutaway view in FIG. 1, reference letters $H_1$–$H_8$ denote pool hoppers, and $H_9$–$H_{12}$ measuring hoppers.

Between the circumferential portions of the pool hopper mounting plate 2 and measuring hopper mounting plate 4, four perpendicular slide shafts 8, 8 . . . are provided and fixed thereto via setting metal members 9, 9' . . . so that the slide shafts are spaced regularly in the circumferential direction of these mounting plates 2, 4. In the upper and lower portions of the space between the pool hopper mounting plate 2 and measuring hopper mounting plate 4, a plate 10 for opening and closing a discharge plate 53 of a pool hopper 1, and a plate 11 for opening and closing discharge plates 63, 63' of a measuring hopper 3 are secured to each sliding shaft 8 via slide bearings 12, 12. Compression springs 80, 80' are provided between the slide bearings 12, 12 and stoppers 79, 79' which are mounted fixedly on the slide shaft 8. Thus, the discharge plate-operating plates 10, 11 are set vertically movable as they are kept in a horizontally-extending state.

A pair of two-ridge clevises 15, 16 are fixed to both of these discharge plate-operating plates 10, 11 so that the clevises extend downward.

A rod end 13 at the upper end of a connecting rod 39 provided vertically in substantially the central portion of the machine frame 5 via a pin 37 is joined pivotably to the two-ridge clevis 15 fixed to the plate 10 for opening and closing the discharge plate 53 of a pool hopper 1.

This connecting rod 39 extends downward through a bore provided in the central portion of the plate 11 for opening and closing the discharge plates 63, 63' of a measuring hopper 3, and a bore provided in the plate 4 to which a measuring hopper 3 is secured.

A rod end 14 at the upper end of a connecting rod 40 provided vertically in the central portion of the machine frame 5 also via a pin 38 is joined pivotably to the two-ridge clevis 16 fixed to the plate 11 for opening and closing the discharge plates 63, 63' of a measuring hopper 3. This connecting rod 40 also extends downward through a bore provided in the central portion of the plate 4 to which a measuring hopper 3 is secured.

Figure 2:
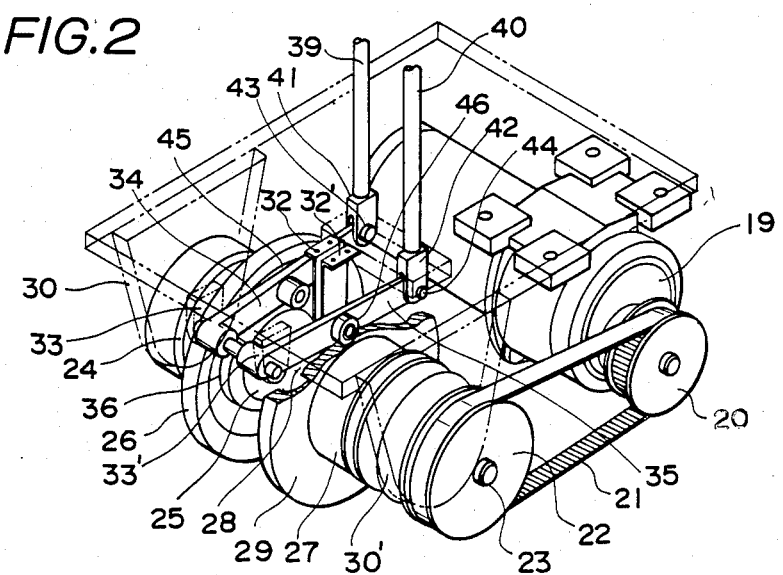
FIG. 2 is a partially cutaway view in perspective of a driving unit.

A mechanism for moving the plate 10 for opening and closing the discharge plate 53 of a pool hopper 1 and the plate 11 for opening and closing the discharge plates 63, 63' of a measuring hopper 3, in the vertical direction along the slide shafts 8, 8 . . . via the connecting rod 39, 40 is constructed as shown in FIGS. 2 and 3.

In the interior of a housing for a driving unit 7, which housing is fixed via bolts to the lower surface of the mounting plate 4 for a measuring hopper 3, a timing belt 21 is wrapped around a timing pulley 20 mounted on an output shaft of a known geared motor 19 and a timing pulley 22 mounted on a driving shaft 23, which is supported on rotary bearings 31, 31' provided on bearing brackets 30, 30'.

The rotary shaft 23 is provided on one side portion thereof with an assembly of a pool hopper opening and closing cam 26 in which an electromagnetic clutch 24 and an electromagnetic brake 25 are unitarily set, and on the other side portion thereof with an assembly of a measuring hopper opening and closing cam 29 in which an electromagnetic clutch 27 and an electromagnetic brake 28 are integrally set.

One electromagnetic clutch 24 is fixed on the bearing bracket 30, and the other electromagnetic clutch 27 on the bearing bracket 30'. One electromagnetic brake 25 is fixed on a fixing metal member 32, and the other electromagnetic brake 28 on a fixing metal member 32'.

A cam 26 for opening and closing the discharge plate 53 of a pool hopper 1 and a cam 29 for opening and closing the discharge plates 63, 63' of a measuring hopper 3 are formed of grooved rotary positivemotion cams, the shape of which is determined on the basis of a predetermined time chart. The links 34, 35, the free end portions of which are supported pivotably on link brackets 33, 33' provided on the casing for the driving unit 7, for the discharge plate 53 of a pool hopper 1 and the discharge plates 63, 63' of a measuring hopper 3 are supported at the front end portions thereof on a pin 36, and at the other end portions thereof on the lower end portions of the connecting rods 39, 40 via pins 43, 44.

The cam followers 45, 46 supported pivotably on the links 34, 35 via pins are engaged with recesses in the corresponding cams 26, 29.

Accordingly, when the geared motor 19 is turned, the cams 26, 29 are turned by the rotary shaft 23 via the timing pulley 20, timing belt 21 and timing pulley 22. Cosequently, the cam followers 45, 46, which are engaged with the recesses in these cams 26, 29 are turned, so that the links 34, 35 are turned about the fulcrum pin 36. As a result, the connecting rods 39, 40, which are supported pivotably on pins 43, 44 in the setting metal members 41, 42, are moved vertically in a predetermined cycle. Therefore, the corresponding discharge plate opening and closing plates 10, 11 are moved by the rod ends 13, 14, which are at the upper end portions of the connecting rods 39, 40, in the vertical direction along the slide shafts 8, 8 . . . via the two-ridge clevises 15, 16. Thus, the discharge plate 53 of a pool hopper 1 and the discharge plates 63, 63' of a measuring hopper 3 can be opened and closed in a predetermined manner.

The impacts occurring in the lower dead points in the cycles of vertical movements of the connecting rods 39, 40 fixed to the discharge plate opening and closing plates 10, 11 are absorbed by the compression springs 80, 80' provided between the stoppers 79, 79' and slide bearings 12, which are provided on each slide shaft 8.

The switches 17, 18 on the plates 10, 11 for opening and closing the discharge plate 53 of a pool hopper 1 and the discharge plates 63, 63' of a measuring hopper 3 will now be described with reference to FIG. 3.

The circumferential portion of the plate 10 for opening and closing the discharge plate 53 of a pool hopper 1 is divided into twelve equal parts, and a pool hopper switch 17, which has cuts in predetermined portions thereof, is provided correspondingly to the pool hopper 1 in each head. A solenoid 50 is provided at the lower side portion of a hook 47 in the switch 17. The solenoid 50 has a catcher 58, which constitutes a clutch projecting outward normally and retracted inward when the solenoid 50 is on, owing to a spring (not shown). At an intermediate portion of the pool hopper switch 17, a rod 49 opposed to a stopper 61 from the lower side thereof, which is attached to the lower surface of the plate 2 to which a pool hopper 1 is secured, is inserted through a bore, which is provided in the hook 47, in such a manner that the rod 49 can be vertically moved. A compression spring 59 is provided between a flange at the upper end of the rod 49 and the hook 47, and an inverted L-shaped link 48 is supported via a pin on the lower end portion of the rod 49.

This inverted L-shaped link 48 is supported pivotably at its intermediate portion via a pin 60 on a bracket provided unitarily on the hook 47, and an outer end of the link 48 is adapted to be turned inward and outward in a perpendicular plane.

A bracket 54 is provided at a circumferential end of the plate 2 to which a pool hopper 1 is secured, in such a manner that the bracket 54 extends downward between the hook 47 and pool hopper, and a pool hopper opening and closing lever 56 is supported at a substantially intermediate portion thereof on the bracket 54 via a pin.

An inner roller 55 on the pool hopper opening and closing lever 56 is engaged rotatably with a downwardly-curved surface of a predetermined curvature formed on the hook 47 so as to extend from the inner side to the outer side thereof. An outer roller 55' on the lever 56 is engaged rotatably via a narrow clearance with a forked portion formed at an inner end section of a pool opening and closing link 57 joined to the discharge plate 53 of a pool hopper 1.

Accordingly, when the driving unit 7 is operated, the plate 10 for opening and closing the discharge plate 53 of a pool hopper 1 is moved vertically between upper and lower dead points in accordance with the vertical movement of the connecting rod 39, so that the rod 49 is moved vertically with its lower portion retracting into and projecting from the hook 47. Consequently, the inverted L-shaped link 48, which is engaged with the rod 49 is turned via the pin 60, and the catcher 58 in the solenoid 50 projects therefrom and retracts therein via a control unit (not shown) to engage with and disengage from the inverted L-shaped switch link 48.

Namely, as shown in the right-hand portion of FIG. 4B, the catcher 58 is normally engaged with the inner end of the inverted L-shaped switch link 48 to restrict the pivotal movement thereof, and the rod 49, hook 47 and pool hopper opening and closing plate 10 are moved together in the vertical direction by the connecting rod 39. As a result, the lever 56 assumes an inner end-lowered inclined posture as shown by a two-dot chain line, and the roller 55 at the inner end of the lever 56 is disengaged from the inverted L-shaped switch link 48. Since the vertical movement of a combination of the mentioned parts is made in this manner with the hook 49 also disengaged from the roller 55, the switch link 57 is not operated, and the discharge plate 53 of a pool hopper 1 is kept closed.

When the pool hopper opening and closing plate 10 has reached the lower dead point, the solenoid 50 is turned on by a control unit (not shown) to draw the catcher inward as shown in FIG. 4A, so that the inverted L-shaped switch link 48 is released. This causes the compression spring 59 provided on the rod 49 to extend upward, and the switch link 48 to turn to right. Consequently, the switch link 48 engages the lower portion of the inner roller 55 on the lever 56, so that the roller 55 engages the free end of the switch link 48 and the recess in the hook 47 and is moved up with the pool hopper opening and closing plate 10 as shown in FIG. 4A. As a result, the lever 56 is turned to right about the pin in the bracket 54 to cause the outer roller 55' on the lever 56 to be displaced downward as shown by a solid line in FIG. 4B. Consequently, the switch link 57 is operated to open the discharge plate 53 of a pool hopper 1.

When the pool hopper opening and closing plate 10 has reached the upper dead point, the rod 49 engages the stopper 61 on the lower surface of the plate 2 to which the pool hopper is secured, to compress the spring 59. The inverted L-shaped switch link 48 is turned to left on the drawing to once press the catcher 58 in the solenoid 50 forcibly into the interior thereof. The catcher 58 then projects outward by the force of a spring (not shown) to engage with the switch link 48 as shown in the right-hand portion of FIG. 4B, and cause the link 48 to be disengaged from the roller 55 on the inner end portion of the lever 56. When the plate 10 is moved down after the link 48 has been disengaged from the roller 55 at the inner end of the lever 56, the roller 55 is pushed down forcibly by the hook 47, so that the lever 56 is turned to left in the drawing to assume the original posture. While the plate 10 is then moved up and down, the hook 47 and inverted L-shaped switch link 48 is moved accordingly without interfering with the roller 55 at the inner end of the lever 56, and the discharge plate 53 of a pool hopper 1 is not opened by the lever 56.

Figure 5:
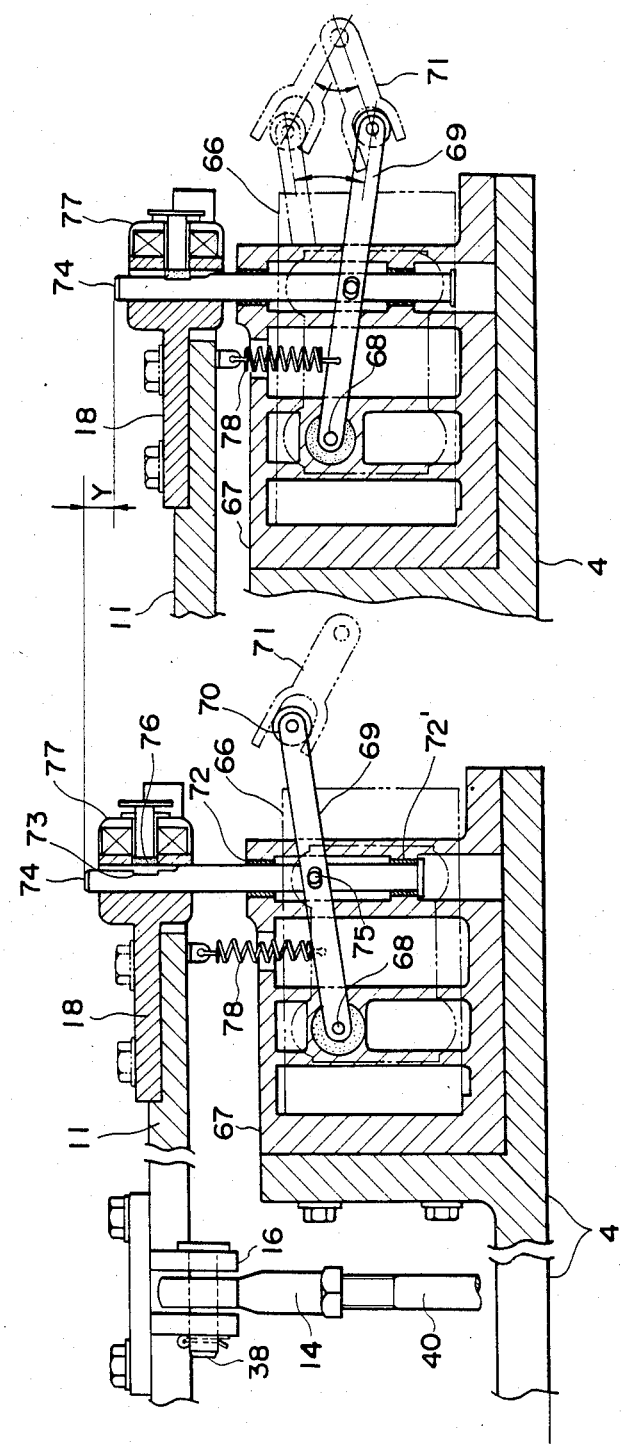
FIG. 5 illustrates the condition of each operating part during an operation for discharging the goods, which have been subjected to the weight measurement, from a measuring hopper.

The switch 18 for the discharge plates 63, 63' of a measuring hopper 3 is constructed as shown in FIGS. 3 and 5. This switch 18 is provided in its free end portion with a vertical bore, through which a toggle type bar 74 is inserted so as to extend downward from the lower end of the bore in such a manner that the bar 74 can be moved up and down relatively to the switch 18. The bar 74 is provided at its upper portion with a clutch recess 73, with and from which a catcher 76, which constitutes a clutch, in a solenoid 77 at the free end of the switch 18 on the plate 11, can be engaged and disengaged.

The bar 74 is inserted loosely through and supported on upper and lower slide bearings 72, 72' provided in a frame 67 which is fixed to the measuring hopper mounting plate 4 and formed with the load cell 66. A lever 69 is supported pivotably via a pin 75 on an intermediate portion of the bar 74.

The inner end portion of the lever 69 is supported pivotably via a pin 68 on the frame 67. A roller 70 at the free end of the lever 69 faces a forked portion at a free end section of a switch link 71, which is connected to the inner and outer discharge plates 63, 63' of a measuring hopper 3, in such condition that the roller 70 is close to but not in engagement with the forked portion.

The upper end of a tension spring 78, the lower end of which is connected to the portion of the lever 69 which is between the pins 75, 68, is joined to the lower surface of the measuring hopper opening and closing plate 11.

Even when the connecting rod 40 is moved vertically to cause the plate 11 to be moved accordingly, the lever 69 is kept inclined with its free end in a higher position as shown in the right-hand portion of FIG. 5, owing to the force of the tension spring 78. Accordingly, the bar 74, which is joined to the lever 69 via the pin 75, is also kept in an upwardly-projecting state. Since the catcher 76 in the solenoid 77 is kept inoperative and in a non-projecting state, the catcher 76 does not engage with the clutch recess 73, and the bar 74 is kept stopped irrespective of the vertical movement of the plate 11, i.e. the switch 18. Accordingly, the roller 70 at the free end of the lever 69 is left positioned in a predetermined part of the forked portion at the inner end section of the switch link 71, and not moved. Therefore, the discharge plates 63, 63' of a measuring hopper 3 are kept closed, and not opened at all.

When the measuring hopper opening and closing plate 11 has then reached the upper dead point, the solenoid 77 is turned on by a control unit (not shown), so that the catcher 76 projects inward to engage with the clutch recess 73 in the bar 74. Consequently, the bar 74 is moved down with the switch 18, and the lever 69 is turned to the right about the pin 68 via the pin 75 as shown by a solid line in the right-hand portion of FIG. 5, to cause the roller 70 at the free end of the lever 69 to enter the forked portion at the inner end section of the switch link 71. As a result, the switch link 71 is actuated to open the discharge plates 63, 63' of a measuring hopper 3 alternately as necessary, and thereby discharge the measured material in the measuring hopper 3 onto predetermined collector chutes, i.e. the inner collector chutes 67, 67' or outer collector chutes 64, 64'. When the supplying of an electric current to the solenoid 77 is interrupted, the catcher 67 is disengaged from the clutch recess 73, so that the lever 69 is immediately turned to left on the drawing by the tension spring 78 to move up the roller 70 at the free end thereof. In consequence, the switch link 71 is moved up to close the opened discharge plate 63 or 63' of the measuring hopper 3, and assume the original posture again.

The operation of the combination measuring apparatus having the above-mentioned construction will now be described. When a material to be measured is supplied from an upper portion of the apparatus onto the distribution table 51 via a supply unit (not shown), it is then fed from this table 51 to the electromagnetic feeder 52 in each head. Owing to the electromagnetic vibration of the feeder 52, the material is supplied to the corresponding pool hopper 1, from which the material is supplied to a measuring hopper 3 joined in an opposed state to and positioned under the pool hopper 1. The weight of the resultant material is measured by the load cell 66, and the results are subjected to computation by a microprocessor (not shown) to determine a combination of measuring hoppers 3 in the heads, in which the weight of the material is the closest to a predetermined target level. One of the discharge plates 63, 63' of each of these measuring hoppers 3 is then opened to discharge the material onto the collector chutes 67, 67' or 64, 64', the resultant material being transferred to the following packaging stage.

In these steps, the discharge plates 53 of the pool hoppers 1 on the upper side of and opposed to the measuring hoppers 3, which were selected for the combination measurement and became empty, are opened by a control unit (not shown) to discharge the material to be measured, from the pool hoppers 1 into the measuring hoppers 3, and thereby repeat a cycle for carrying out the subsequent combination measurement.

The opening and closing of the discharge plates 53 of these pool hoppers 1 and the discharge plates 63, 63' of these measuring hoppers 3 are done in the following manner. The rotation of the constantly-rotating geared motor 19 in the driving unit 7 is transmitted to the rotary shaft 23 via the timing pulley 20, timing belt 21 and timing pulley 22 to cause the hopper opening and closing cams 26, 29 to be turned. Due to the periodic actions of the cam followers 45, 46 engaged with the recesses in these cams 26, 29, the predetermined discharge plate opening and closing plates 10, 11 are moved up and down in a predetermined cycle along the slide shafts 8, 8 . . . by the connecting rods 39, 49 via the pivotal movement of the links 34, 35. The impact occurring due to the vertical movement of these plates 10, 11 is absorbed by the compression springs 80 provided on the slide shafts 8, 8 . . . The discharge plates 63, 63' of a measuring hopper 3 are operated as follows. As described previously, when an electric current is applied from the control unit to the solenoid 77 with the vertically moving measuring hopper opening and closing plate 11 at the upper dead point, the catcher 76 engages with the clutch recess 73 to cause the bar 74 to start being moved down with the switch 18 and plate 11, and the lever 69 to be turned against the tension spring 78 about the pin 68 so that the roller 70 at the free end of the lever 69 lowers. This roller 70 at the free end of the lever 69 engages with the forked portion at the inner end section of the switch link 71 to open one of the discharge plates 63, 63' and transfer the measured material to the following packaging stage via either the collector chutes 67, 67' or collector chutes 64, 64'. When the discharge plate opening and closing plate 11 has reached the lower dead point, the electric current supplied to the solenoid 77 is cut off, so that the bar 74 is released from the clutching force. Consequently, the bar 74 and lever 69 start being moved up owing to the force of the tension spring 78, and the switch link 71 is also moved up. As a result, one of the discharge plates 63, 63', which has been opened, is closed. When the vertically-moving discharge plate opening and closing plate 10 is in the lower dead point, the catcher 58 in the solenoid 50 in an ON-state retracts to release the inverted L-shaped switch link 48, which is then turned outward by the force of the compression spring 59. Consequently, the inner roller 55 on the lever 56 is operated with the hook 47 to engage therewith. This roller 55 is moved up to cause the lever 56 to be displaced downward in the outward direction, and the switch link 57 to be operated, so that the discharge plate 53 of a pool hopper 1 is opened. As a result, the material to be measured in the pool hopper 1 is discharged into a measuring hopper 3 positioned below the same. The pool hopper opening and closing plate 10 is then moved up, and the rod 49 engages the stopper 61, which is provided on the pool stopper mounting plate 2, to be pushed downward against the compression spring 59 with respect to the hook 47. When the parts reach the positions shown in the right-hand portion of FIG. 4B, the pool hopper opening operation is completed. When the inner end of the switch link 48 engages the catcher 58 again, so that the plate 10 starts lowering, the roller 55 is pushed back downward by the hook 47, and the lever 56 assumes its orignal posture again. The discharge plate 53 is closed again by the switch link 57, and the plate 10 is moved vertically so that the lever 56 returns to the position in the drawing to make preparations for a subsequent operation for discharging a material to be measured, into measuring hoppers 3 selected for a subsequent combination weight measuring operation.

When such a cycle is repeated, the discharge plates 63, 63' of the measuring hoppers 3 selected for carrying out a combination weight measuring operation are opened and closed in a predetermined manner. The discharge plates 53 of the pool hoppers 1, which have become empty, are also opened and closed in a predetermined manner so as to receive the supply of a material to be measured.

During this time, the opening and closing of the discharge plates 53, 63, 63' of the hoppers 1, 3 are done in accordance with the vertical movements of the discharge plate opening and closing plates 10, 11, which movements are made by the driving unit 7 in the central portion of the apparatus via the connecting rods 39, 40. Therefore, radial vibration does not occur. Accordingly, the pool hopper 1 and measuring hopper 3 in each head can be collectively provided in the central portion of the apparatus as far as these parts can meet the designing conditions. This enables the radius of the apparatus to be minimized, and the height of the surface along which the material is slide-dropped to be reduced. As a result, the step of dropping the material to be measured can be carried out in a shorter period of time, and the speedup of a combination weight-measuring operation by this apparatus can be promoted.

In the above embodiment, the driving unit 7 is constantly operated, and the discharge plate opening and closing plates 10, 11 are constantly moved up and down, the hoppers being opened and closed by the predetermined clutching operations of the solenoids 50, 77 via a control unit. The discharge plates 53, 63, 63' may be operated only when necessary by the control actions of the electromagnetic clutches 24, 27 and electromagnetic brakes 25, 28. The design of this apparatus can also be modified in the following manner. The hook 47 may be provided on the lower side of the switch 17 and not on the upper side thereof. The mode of construction of the switches for the pool hoppers and measuring hoppers may be contrary to that shown in the embodiment. Namely, a pool hopper may consist of a toggle type hopper, and a measuring hopper a hook type hopper. These hoppers may consist of hoppers of the same type, and thereby be standardized. The heads may not be circularly arranged; they may be arranged in parallel rows or rectangularly. The slide shafts in the above embodiment may be used also as support posts to thereby reduce the number of parts. This enables the space in the interior of the apparatus to be utilized effectively, a total weight of the apparatus to be reduced, and the rigidity of the apparatus to be improved.

If the arcuate movement of a lever at the free end of a switch causes any inconvenience, a system in which the lever is moved straight in the horizontal direction like a push rod by utilizing a bell crank can be utilized.

The discharge plate opening and closing plate may consist, instead of a disc, of a plurality of members prepared by dividing a disc into a plurality of parts. Each member is supported on a slide shaft, and recesses are formed in both surfaces of the cams so as to carry out the material-discharging operations at staggered instances. This enables an operation for discharging a material to be measured to be carried out smoothly without causing a bridging phenomenon.

According to the present invention described above, the mechanisms for cyclically opening and closing the discharge plates of a pool hopper and a measuring hopper in each of a plurality of combination measuring heads are designed so that the mechanisms are moved vertically and not to and fro in the radial direction, such construction of these mechanisms constituting the first characteristics of the present invention. This makes it unnecessary that the discharge plate operating mechanisms are moved horizontally. Accordingly, the discharge plates in the apparatus and the horizontally-arranged measuring hoppers can be provided collectively near the center of the apparatus, i.e., a centralized configuration of parts can be employed. In the apparatus having circularly-arranged parts, the outer diameter thereof can be reduced considerably, so that the distance the material to be measured slide-drops can be reduced. This enables the material to be measured to be processed at a high speed, and the capability of the apparatus to be improved to a great extent.

Since the distance the discharge plate operating mechanisms are moved horizontally is reduced in such a manner, the lengths of the links in these mechanisms can be minimized, so that the vibration occurring due to the pivotal movements of the links decreases. Accordingly, the durability of the apparatus can be improved, and a decrease in the combination measuring accuracy, which is caused by the useless shaking and vibration of the parts, can be prevented.

Moreover, the apparatus can be made compact to a smaller height, and the center of gravity of the apparatus can be lowered. Therefore, the apparatus can be manufactured easily, and the maintenance, inspection and repairing thereof can be done easily. This enables the prolongation of the lifetime of the apparatus.

Since one apparatus can be made compact, the space can be utilized effectively, and a combination measuring operation can be carried out easily.

The present invention is not, of course, limited to the above embodiment; it may be modified in various ways within the scope of the appended claims.

What is claimed is:

1. A combination measuring apparatus, which is mounted on a machine frame, and which has a plurality of heads, each of which is provided therein with a pool hopper having a discharge plate, and a measuring hopper having discharge plates, disposed in opposition to and on the lower side of said pool hopper and mounted on a weight detecting unit; and a discharge plate opening and closing unit to which the discharge plates of said hoppers are connected via link means, characterized in that said discharge plate opening and closing unit consists of a driving unit provided on said machine frame on which said discharge plate opening and closing unit is mounted, and a vertically movable unit connected to said driving unit and capable of being connected selectively to said link means via a clutch unit.

2. A combination measuring apparatus according to claim 1, wherein said heads are circumferentially arranged.

3. A combination measuring apparatus according to claim 1, wherein said heads are arranged in a lateral row.

4. A combination measuring apparatus according to claim 1, said discharge plate opening and closing unit consists of connecting rods, and discharge plate opening and closing plates joined to said connecting rods.

5. A combination measuring apparatus according to claim 1, wherein said apparatus has a single discharge plate opening and closing plate.

6. A combination measuring apparatus according to claim 4, wherein said discharge plate opening and closing plate is divided circumferentially into a plurality of parts.

* * * * *